US007599947B1

(12) United States Patent
Tolbert et al.

(10) Patent No.: US 7,599,947 B1
(45) Date of Patent: Oct. 6, 2009

(54) METHOD AND SYSTEM FOR CONVERTING HIERARCHICAL DATABASE SCHEMAS INTO RELATIONAL DATABASE SCHEMAS

(75) Inventors: Douglas Marshall Tolbert, Newport Beach, CA (US); Subramaniam Ramamurthi, Rancho Santa Margarita, CA (US); Vikki Mei-Whey Lai, Orange, CA (US); Jennifer Erin Kays, Mission Viejo, CA (US); Kung Yi Lin, Irvine, CA (US); Randy Alan Steuckrath, Laguna Niguel, CA (US); Minh-Nguyet Tran, Cypress, CA (US)

(73) Assignee: Unisys Corporation, Blue Bell, PA (US)

( * ) Notice: Subject to any disclaimer, the term of this patent is extended or adjusted under 35 U.S.C. 154(b) by 349 days.

(21) Appl. No.: 11/796,014

(22) Filed: Apr. 26, 2007

(51) Int. Cl.
*G06F 7/00* (2006.01)
*G06F 17/00* (2006.01)
(52) U.S. Cl. .................................... 707/100; 707/104.1
(58) Field of Classification Search .................. 707/1–4, 707/100–102, 104.1, 6, 10
See application file for complete search history.

(56) References Cited

U.S. PATENT DOCUMENTS

| 6,684,222 | B1 | 1/2004 | Cornelius et al. | |
| 6,732,045 | B1 | 5/2004 | Irmer | |
| 7,076,728 | B2* | 7/2006 | Davis et al. | 715/205 |
| 7,082,435 | B1* | 7/2006 | Guzman et al. | 707/102 |
| 7,318,063 | B2* | 1/2008 | Brychell et al. | 707/100 |
| 7,487,168 | B2* | 2/2009 | Rys et al. | 707/101 |
| 7,496,637 | B2* | 2/2009 | Han et al. | 709/217 |
| 2004/0093344 | A1* | 5/2004 | Berger et al. | 707/102 |
| 2007/0168381 | A1* | 7/2007 | Fagin et al. | 707/102 |
| 2007/0174231 | A1* | 7/2007 | Hernandez-Sherrington et al. | 707/2 |

FOREIGN PATENT DOCUMENTS

WO  WO 02/39322  5/2002

OTHER PUBLICATIONS

Sihem AmerYahia, Fang Du, and Juliana Freire (2004), A Comprehensive Solution to the XML-to-Relational Mapping Problem, pp. 31-38.*

* cited by examiner

*Primary Examiner*—Don Wong
*Assistant Examiner*—Merilyn P Nguyen
(74) *Attorney, Agent, or Firm*—Robert P. Marley; Alfred W. Kozak

(57) ABSTRACT

A specialized server holding a hierarchical database works with a Graphical User Interface to transform a hierarchical schema by utilizing an XMI file which is used with a modeling tool to develop a relational schema for display and use in a relational database in the Graphical User Interface.

8 Claims, 5 Drawing Sheets

LOADING DMSII SCHEMA INTO METASTORE
FROM A DESCRIPTION FILE

GENERATE SCHEMA XMI FROM METASTORE

REVERSE ENGINEER SCHEMA

METHOD AND SYSTEM FOR CONVERTING HIERARCHICAL DATABASE SCHEMAS INTO RELATIONAL DATABASE SCHEMAS

CROSS REFERENCES TO RELATED APPLICATIONS

This application is related to U.S. Pat. No. 6,351,744 B1 entitled "Multi-Processor System for Database Management" which issued Feb. 26, 2002 and is also related to the following patent application: Ser. No. 11/542,778 entitled "METHOD AND SYSTEM FOR CONVERTING RELATIONAL DATABASE SCHEMAS TO HIERARCHICAL DATABASE SCHEMAS"; all are incorporated herein by reference.

BACKGROUND OF THE INVENTION

A Database Management System consists of a set of tools used to develop and manage a database. The presently described system utilizes DMSII, which is a Database Management System available on a Unisys Corporation's ClearPath HMP NX, and also the Unisys A-Series systems. A background for the Unisys DMSII systems is available in a publication of the Unisys Corporation, Document 8807 6625 000, entitled "Getting Started With DMSII" and published in September 1997 by the Unisys Corporation. The DMSII Utilities provide database backup and recovery capability for the entire database or for partial databases. The background operations of the DMSII utility enhancements are published in a Unisys Corporation publication Document 98037/4 and entitled "DMSII Utility Enhancements" as published on Mar. 31, 1999.

Database Management Systems are used by many large and small businesses such as airline reservation systems, financial institutions, retail chains, insurance companies, utility companies and government agencies. The present Database Management System (DMS) in its form designated as DMSII is used to build database structures for items of data according to some appropriate logical model, such as relational, hierarchical, or network. Further, the Database Management System is used to manage the database structures and keep the structures in some other stable order while various application programs may be retrieving or changing the data. The present embodiment of DMSII has a Data Definition Language designated as Data And Structure Definition Language (DASDL).

There are various tasks that are performed in database management and these involve (i) monitoring and optimizing database performance; (ii) the use of database control for monitoring multi-program database access; (iii) the function of the data integrity and safety done by integrity checking and preventing access to the same data by multiple applications occurring at the same time; (iv) the function of defining data structures and the data fields within them, including the function of modifying data structures; (v) data access operations and developing an application program to retrieve data or to change data; (vi) the function of data shareability to provide multi-program access without conflicts and provide database definitions to the application program; (vii) in database and data security, to prevent unauthorized database access; (viii) ensuring independence of application programs from certain data changes and preventing the revision of application programs every time a structure changes; (ix) in database and data recovery, performing the resumption of database operations after an interruption; (x) tracking data changes by keeping a record of every change made to the data; (xi) for data change integrity, ensuring that update changes are applied to, or removed from, the database in their entirety; (xii) providing a recent copy of the database as a reserve by backing-up the database and storing copies of audit files and all other database files; (xiii) providing for database scalability by growing or shrinking the database according to the ongoing needs at the time.

The DMSII provides standard software files that perform services and operations for all the databases connected to the system's Enterprise Server. This enables a viewing of a list of all these files on the user terminal.

A Database Administrator (DBA) is used to keep the database running smoothly and to enforce the rules for data integrity and security.

In environments where Unisys ClearPath servers are used, systems from several other hardware and software vendors may be found. Many of the business databases on these other systems are based on the Relational Database Model. The need for database administrators (DBA) to leverage their time as efficiently as possible has lead the database industry to provide some ease-of-use features to their products. For example, a DMSII Database Operations Center (DOC) provides a graphical user interface (GUI) for the Enterprise Database Server in its Extended Edition.

In order to provide flexibility in database operations, it is not only desirable to convert relational schemas to hierarchical schemas, but also to provide the ability to convert hierarchical schemas to functionally equivalent relational schemas.

FIELD OF THE INVENTION

A database operation center (DOC) is expanded and enhanced in order to allow users to create a functionally equivalent relational database schema from a new, or from an existing, hierarchical database schema.

DESCRIPTION OF RELATED ART

An International Publication WO 02/39322 to Huffman is entitled "Method and System for Translating Data Associated with a Relational Database".

Here in Huffman a method is used to prepare a hierarchical textual file which can then be stored in a relational database which is done by (a) defining a tabular structure containing data attribute fields and data element fields; (b) accepting a hierarchical textual file containing structured data elements; (c) determining the data attributes associated with the corresponding structured data elements of the accepted hierarchical textual file, and (d) storing the determined data attributes that show the generally tabular data structure of the relational database to preserve a hierarchical aspect of the hierarchical text file.

Likewise, a U.S. Pat. No. 6,684,222 B1 to Cornelius corresponds to the above WO 02/39322 of Huffman. Another U.S. Pat. No. 6,732,045 B1 to Warshovsky deals in mapping between XML and relational formats.

The present application herein is much more versatile in that it allows a Server to select a special hierarchical schema from a Metastore of schemas for generating a CWM-based XMI file (of a specialized Data Management System) for transformation to an XMI file to develop a relational schema correlated to said hierarchical source schema.

SUMMARY OF THE INVENTION

A mainframe enterprise server database (DMSII) is a secured proven platform for mission critical applications. The problem addressed herein is the tooling to enable iterative mapping of the mainframe database into a Relational Database Schema and converting them into an XMI medium suitable for managing the schema from Relational Modeling Tools.

This is accomplished by importing the database schema from a description file created by the Data Management System (DMSII). This involves reading the file then loading and persisting it into the Metastore Database using the mapping of the schema data into the DMSII model (based on Common Warehouse Metamodel) (CWM).

The Metastore Database is specifically designed for holding such DMSII models.

To convert a specific DMSII model described in a hierarchical format into a corresponding relational database schema, the DMSII model is first translated to an XMI file format (using models derived from the Common Warehouse Metamodel). This XMI file is then transferred to a personal computer where it is translated, using an XSLT stylesheet, into a secondary XMI file. The resulting secondary XMI file has tagged information representing schema artifacts of the Data Management System (DMSII) and is in a format understood by several leading Modeling Tools in the computer industry. Finally, the mainframe database is converted into a relational database schema, corresponding to that described in the secondary XMI file, which can be managed with relational modeling tools.

GLOSSARY ITEMS

Figure 1:
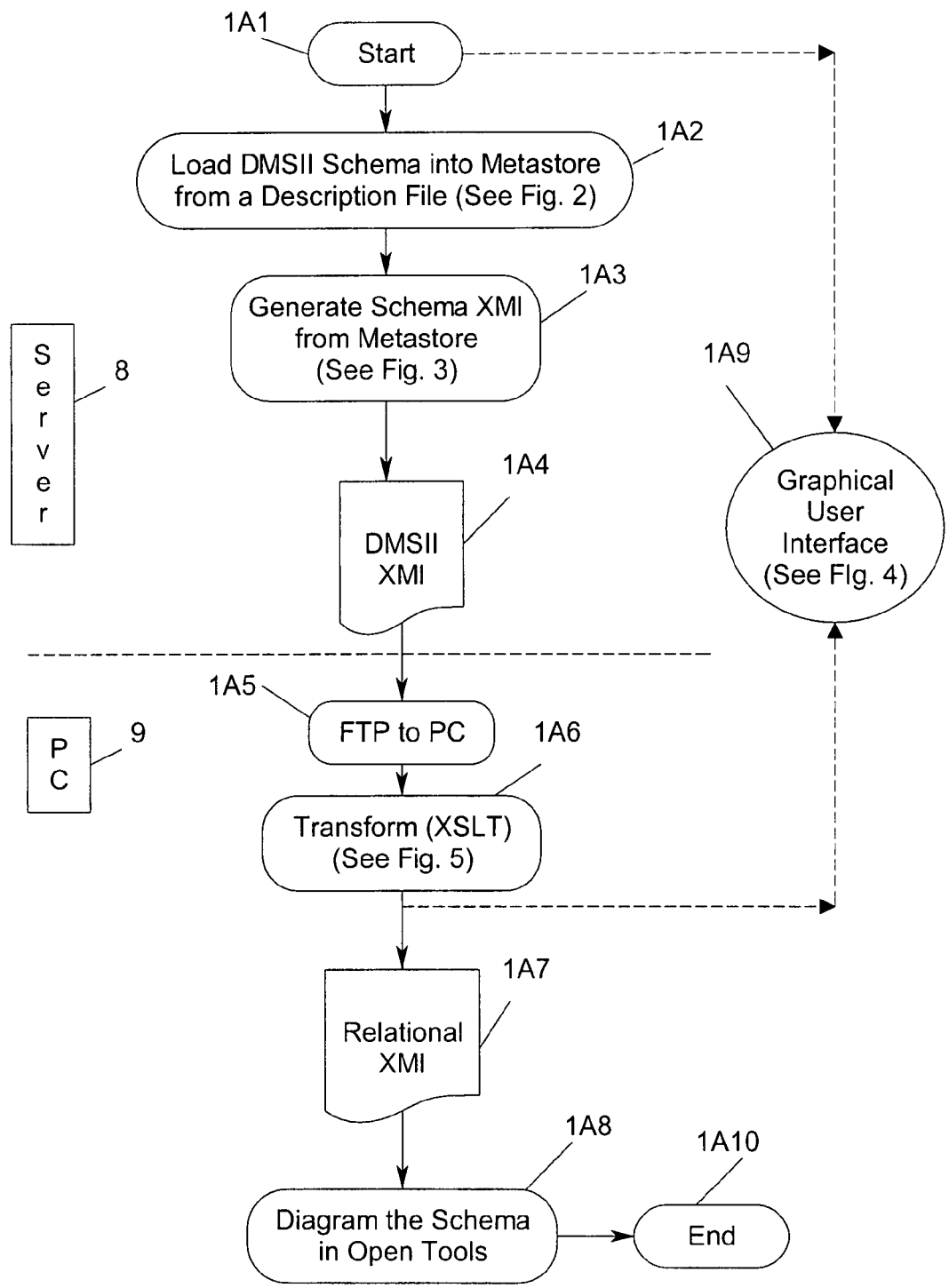
FIG. 1 is a generalized drawing showing the main flow steps involved to convert the hierarchical schema into a relational schema for the database.

1. AUTO-GENERATED METASTORE: The schema for the DASDL of the METASTORE database is generated from the model. The model is the Common Warehouse Metamodel plus self-design editing commands resident in the XMI input file. This schema is generated by a program which may be a code generator.

2. CATALOG ELEMENT: A node in a CWM-based XMI document describing a relational Catalog. A Catalog is a collection of schemas. In this case, the Catalog has only one schema. A Relational Catalog is one that contains relational schemas.

3. CHECK-IN SCHEMA: A relational database schema that is exported from a modeling tool as an XMI file and checked into the METASTORE DATABASE.

4. CHECK-IN SCHEMAS WITH VERSION CONTROL: Schemas are persisted in a METASTORE database in its entirety for each version of the schema.

5. CHECK-OUT SCHEMA: A version of a schema in the Metastore which has check-out status set.

6. CODE GENERATOR: A design-time Visual Basic 6 program that reads the 'CWM-DMSII' model and generate the schema for the Metastore database, MSSUPPORT library, etc.

7. COLUMN ELEMENT: A node in a CWM-based XMI document describing a relational database column.

8. COMMAND STORE UTILITY: Command Store Utility is a Unisys-developed Visual Basic control packaged with the Database Operations Center that provides the capability to save and restore requests during and between Database Operations Center sessions.

9. COMMON WAREHOUSE METAMODEL (CWM): Standard interfaces that can be used to enable easy interchange of warehouse and business intelligence metadata between warehouse tools, warehouse platforms and warehouse metadata repositories in distributed heterogeneous environments. CWM is a dialect of XMI designed specifically for this purpose.

10. CONTROL FILE: The Control File is unique to each database and maintains state information between activations of a database as well as across Halt/Loads.

11. CWM: Common Warehouse Metamodel.

12. DASDL: Data and Structure Definition Language. The language used to specify the structure and specific software configuration for a database. This is also the abbreviated name for SYSTEM/DASDL, the compiler used to create Enterprise Database Server Description Files from the DASDL source.

13. DASDL FEATURES: The database features that make up the characteristics of a DMSII database. Some of them relate closely to a relational database model and some of are unique to the DMSII database.

14. DASDL IMPORT-EXPORT: A feature used to provide the ability to graphically define, modify and create the schemas of DMSII databases and manage their deployment.

15. DASDL SOURCE: The symbol file containing the data and structure definition for an Enterprise Database Server database. The DASDL compiler creates an Enterprise Database Server Description file from this source.

16. DATA SET: A node in a CWM-based XMI document describing a DMSII Data Item. Also called a DMSII Dataset—. In the Enterprise Database Server, a collection of related data records stored in a file on a random-access storage device. A dataset is similar to a conventional file. It contains data items and has logical and physical properties similar to files. However, unlike conventional files, datasets can contain other datasets, sets, and subsets. An example is shown below:

a. <CWMXDMSII.DataSet xmi.id="_7" name="Employee" visibility="public" namespace="_6" organization="STANDARD">
<CWM.Classifier.feature>
<CWMXDMSII.DataItem xmi.id="_8" name="employeeNumber" type="_9" visibility="public" isRequired="true" initialValue="" length="10"/>
<CWMXDMSII.DataItem xmi.id="_10" name="employee-first-name" type="_11" visibility="public" isRequired="false" initialValue="" length="30"/>

```
<CWMXDMSII.DataItem           xmi.id="_12"
   name="empoloyee-last-name"       type="_11"
   visibility="public" isRequired="false" initialValue=""
   length="30"/>
 </CWM.Classifier.feature>
</CWMXDMSII.DataSet>
```

17. DBA: Database Administrator. A person responsible for managing and maintaining the definitions, accessibility, integrity, security, backup and recovery of the database, and qualifying all changes to database performance.

18. DATABASE ELEMENT: A node in a CWM-based XMI document describing a DMSII database.

19. DATABASE OPERATIONS CENTER: The software product that enables a user to perform database administration functions and to perform Enterprise Database Server utilities. Database Operations Center (DOC) includes Command Store Utility.

20. dbaMONITOR: dbaMONITOR™ is a database administrator's tool which can be utilized for controlling and monitoring Enterprise Database Server (DMSII) database environments. dbaMONITOR works with any database system that is DMSII-based: DMSII, LINC, SIM and SQLDB.

21. dbaTOOLS: dbaTOOLS™ is a database administrator's tool which can be utilized for controlling and monitoring Enterprise Database Server (DMSII) database environments. dbaTOOLS works with any database system that is DMSII-based: DMSII, LINC, SIM and SQLDB.

22. DEPLOY SCHEMA: A version of a schema in the Metastore that is associated with a running database.

23. DEPLOYED DATABASE: An MCP server database that is created from a schema in the Metastore Database.

24. DESCRIPTION FILE: The Description File contains the machine-readable layout of every aspect of a database. A new copy is generated by DASDL for each format level and is used by SYSTEM/DMCONTROL as well as DMINTERFACE in support of the language compilers.

25. DMCONTROL: SYSTEM/DMCONTROL is a database utility program that creates and maintains the Control File.

26. DMINTERFACE: A co-routine used by the language compilers to translate the properties of a database into the record area offsets used by the compiled application program.

27. DMSII: Unisys Data Management System II. See Enterprise Database Server.

28. DMSII DATA TYPES: Data types that are designed into DMSII databases. Examples are: ALPHA (character data), NUMBER (numeric data).

29. DMSII MODEL: The CWM DMSII extension package contains classes supporting the description of DMSII database schemata and their deployment. The DMSII extension package is provided as an example demonstrating appropriate usage of CWM classes in modeling this and similar DMS environments.

30. DMSII XMI FILE (CWM-BASED): An XMI document which follows the CWM standard. This document describes a DMSII database.

31. DMSUPPORT: The DMSUPPORT library is unique to each format level of a database. It contains the mappings between the storage layouts used by the database and those used within the application program record areas.

32. DOC: Database Operations Center.

33. EMBARCADERO ER/STUDIO™: This is a third party modeling tool that is used by Unisys to qualify the features of the product. This tool deals with diagramming the schema, manipulation of schema, and transforming schema among various industry standard file formats.

34. EMBARCADERO MODELING TOOL™: ER/Studio. A model-driven data architecture and database design solution.

35. ENTERPRISE DATABASE SERVER: The comprehensive, primary database management software package developed by Unisys that is in use on Unisys Series and ClearPath families of mainframe computers.

36. FORMATTING OBJECTS (XSL-FO), a language for specifying formatting semantics. See also XSL-FO, XSLT.

37. FTP: File Transfer Protocol. The Internet standard high-level protocol for transferring files from one machine to another over TCP/IP networks.

38. LANGUAGE—NEUTRAL INDUSTRY STANDARD: A standard based on function, not an implementation language or interface language.

39. MAINFRAME DATABASE: Also known as DMSII database, Enterprise Database Server. This is the database that runs on Unisys ClearPath Servers.

40. MASTER CONTROL PROGRAM (MCP): The operating system developed by Unisys that is in use on A-Series and ClearPath families of mainframe computers.

41. RELATIONAL XMI FILE: An XMI file containing a description of components of a relational database schema.

42. METASTORE: A DMSII database whose schema is generated from the DMSII extended CWM-based model. This database holds all the schemas of DMSII databases of the system.

43. METASTORE DATABASE SERVER: An Enterprise Database Server is a database server that resides on an MCP Server. It is designed to store database schema information based on the Common Warehouse Meta Model (CWM).

44. MODIFIED SCHEMAS: Schemas in the Metastore Database can be updated using the check-out feature by downloading the latest version of the schema and importing the XMI file back into the modeling tool.

45. MSDESCLOADER: The program that reads the description file, packages the schema, and loads it into Metastore database using the methods provided by the MSSUPPORT library.

46. MSOR: Marketing Statement of Requirements.

47. MSGENERATOR: An ALGOL program that extracts a schema from Metastore and generates a DASDL source file and an XMI file (based on the DMSII extended CWM-based model).

48. MSSUPPORT: A machine generated (by the code generator) ALGOL library that exports 'methods' for user programs. These methods allow user programs to create records in the Metastore database for storing the schema information. These methods also allow editing, deleting and inquiring of the schema information.

49. MSSUPPORT LIBRARY: A DMALGOL library program generated from the DMSII extended CWM-based model. This internal library serves utility programs and provides functions to access/update/delete schemas residing in the Metastore database.

50. MSUTILITY: A utility program written in ALGOL that provides supportive functions to help the Database Operational Center Server to accomplish user functions of DASDL Import-Export.

51. MSXMILOADER: An ALGOL program that reads the XMI file (based on the DMSII extended CWM-based model) and stores the schema in the Metastore database.

52. PERSISTED MODEL: Model stored in a METASTORE database.

53. PPG: Programmer's Process Guide.

54. PROGRAMMER'S WORKBENCH: Programmer's Workbench (formerly NX/Edit) is a client/server application that integrates the editing and patching capabilities of CANDE and the Editor utility with the familiar graphical interface of the Windows environment. CANDE is the Command and Edit language for ClearPath MCP Servers. It provides generalized file preparation and updating capabilities in an interactive terminal-oriented environment such as NX/View.

55. RDB: See Remote Database Backup.

56. RELATIONAL DATABASE: A database in the form of tables which have rows and columns to show the relationships between items, and in which information can be cross-referenced between two or more tables to generate a third table. A query language is used to search for data. If data is changed in one table, it will be changed in all related tables. A database that has only one table is called a flat file database.

57. RELATIONAL DATABASE SCHEMA: A schema describing a relational database. See definitions for Schema and Relational Database.

58. RELATIONAL MODELING TOOLS: Third party software that allows managing relational databases in terms of diagramming the schema, generating databases, and converting schemas among multiple industry standard file formats.

59. RELATIONAL SCHEMA MODEL: A database schema of a relational database represented by an industry standard modeling XMI format such as Common Warehouse Metamodel.

60. REMOTE DATABASE BACKUP: A disaster recovery capability for DMSII databases that enables the replication of an audited (primary) database on a second Server. The replicated (secondary) database is kept synchronized with the primary database through the application of audits from the primary database. The secondary database can take over the role of the primary database.

61. REORGANIZATION: The process used to change the physical layout of a data structure as well as to add or delete fields.

62. SAX: Simple API for XML, originally a Java-only API, SAX was the first widely-adopted API for XML in Java, and is a "de facto" standard.

63. SCC: Software Configuration Control.

64. SCHEMA: A set of rules describing the format of a database.

65. SCHEMA ELEMENT: A node in a CWM-based XMI document describing a relational Schema.

66. SERVER: Part of a computer architecture called a Client/Server architecture. It is the software running on an individual's PC or a centralized computer system. The server responds to requests from a companion application called a client. For Database Operations Center, the server runs on the ClearPath MCP Server computer.

67. SET ELEMENT: A node in a CWM-based XMI document describing a DMSII Set. Below is an example of a Set element:

a. <CWMXDMSII.Set xmi.id="__465665" name="ORDERSNUMBER" visibility="public" setType="INDEX SEQUENTIAL" spannedClass="__465661" isSorted="FALSE">
<CWMXDMSII.Set.keyDataItem>
<CWMXDMSII.DataItem xmi.id="__10000020" name="TITLE" xmi.idref="__465704"/>
</CWMXDMSII.Set.keyDataItem>
<CWM.Index.indexedFeature>
<CWM.IndexedFeature xmi.id="__465720" name="ISBN" visibility="public" isAscending="TRUE" feature="__465703" index="__465665"/>
</CWM.Index.indexedFeature>
<CWM.Namespace.ownedElement>
<CWMXDMSII.DASDLProperty xmi.id="__10000021" name="setType" visibility="public" owner="__465665" text="INDEX SEQUENTIAL"/>
<CWMXDMSII.DASDLProperty xmi.id="__465721" name="LOADFACTOR" visibility="public" owner="__465665" text="66"/>
<CWMXDMSII.DASDLProperty xmi.id="__465722" name="BLOCKSIZE" visibility="public" owner="__465665" text="100 ENTRIES"/>
<CWMXDMSII.DASDLProperty xmi.id="__465723" name="AREAS" visibility="public" owner="__465665" text="20"/>
<CWMXDMSII.DASDLProperty xmi.id="__465724" name="AREASIZE" visibility="public" owner="__465665" text="150 TABLES"/>
<CWMXDMSII.DASDLProperty xmi.id="__465725" name="CHECKSUM" visibility="public" owner="__465665" text="TRUE"/>
</CWM.Namespace.ownedElement>
</CWMXDMSII.Set>

68. SPO: Single Point Operations allows one operator to manage multiple heterogeneous computer systems from a single graphical display. Systems can be centrally located or distributed. SPO is a key component for automated, centralized operations of a multi-system environment.

69. SQL INDEX ELEMENT: A node in a CWM-based XMI document describing a relational Index.

70. SQL SIMPLE TYPE: A node in a CWM-based XMI document describing a relational data Type.

71. SQL SERVER: A multi-user relational database management system based on ISO standards.

72. SURE: SURE is a system that provides life cycle support for development on Unisys CP/NX Series systems.

73. USER COMMUNICATION FORM: This form is used to record, and track the problems that are occurring in the software.

74. TOOLING—MODELING TOOLS: Industry-wide programming tools that allow creation, manipulation, and processing of database schemas using diagrams in a graphical user interface style. Northwind is a common sample database provided by Microsoft. It is an example of a relational database. "Open Tools" are third party products designed to model relational databases. The user will import their relational schema into one of these products. They can view, modify and save their schema.

75. TOOL—EMBARCADERO: A modeling tool enabling a user to create an XMI file representation of a relational model database.

76. VDBS: Visible Database Stack. A set of commands that are issued directly to a database stack to interrogate or change some aspect of the database configuration.

77. WFL: Workflow Language. On ClearPath MCP computers, WFL is used for constructing jobs that compile or run programs. WFL is a true programming language with its own compiler that either produces an object code file used in running a job or executes a job interpretively. A WFL job is always recompiled each time it is run.

78. XMI DIALECT: A specific application of XMI to provide for interchange of metadata within a specific usage domain. For example, CWM is an XMI dialect enabling interchange of metadata about data warehouses and related business intelligence systems.

79. XMI FILE (CWM-BASED): An XMI document which follows the CWM standard.

80. XMI BASED: The description of a model using XMI file formats.

81. XMI: XML Metadata Interchange. It is a use of the Extensible Markup Language that is intended to provide a standard way for programmers and other users to exchange information about metadata (essentially, information about what a set of data consists of and how it is organized). Specifically, XMI is intended to help programmers using the Unified Modeling Language (UML) with different languages and development tools to exchange their data models with each other. In addition, XMI can also be used to exchange information about data warehouses, using the CWM XMI dialect. Effectively, the XMI format standardizes how any set of metadata is described and requires users across many industries and operating environments to see data the same way. An XMI file is a special case of an XML file and is thereby subject to all of the well-formedness rules of XML files.

82. XML ATTRIBUTE: Information added to a tag to provide more information about the tag, such as:
<ingredient quantity="2"units="cups">flour</ingredient>.

83. XML ELEMENT: Information delimited by a start tag and an end tag in an eXtensible Markup Language (XML) document. An example would be <Lastname>Davalio</LastName>.

84. XML: Extensible Markup Language: It is a simple, very flexible text format derived from SGML (ISO 8879). Originally designed to meet the challenges of large-scale electronic publishing. XML is also playing an increasingly important role in the exchange of a wide variety of data on the Web and elsewhere.

85. XML PARSER: A tool used to convert a stream of XML information into a set of structures that an application can use.

86. XML SCHEMA: A specification providing a common base for data description and validation in XML environments. XML schema replaces Document Type Definition (DTD) by defining a greater set of data types with more explicit data descriptions. XML schema has been developed as an open, vendor-neutral format to enhance information exchange and e-commerce over the Internet. It is also a standard for the description and encoding of data.

87. XML STYLESHEET: Contains formatting rules that are applied to an XML file referencing the stylesheet. The standard set of rules for XML stylesheets is the Extensible Stylesheet Language (XSL), see also XSL.

88. XML SYNTAX: A fragment of well-formed XML text.

89. XSDL: Acronym for XML Schema Description Language. A Worldwide Web Consortium (W3c) recommendation for representing XML structure. XSDL is capable of describing complex XML-based data structures, and provides options not available with Document Type Definitions (DTDs), including namespace support, XML data types, and improved extensibility and data type support.

90. XSL: Acronym for Extensible Stylesheet Language. A Worldwide Web Consortium (W3C) standard stylesheet language for XML documents. XSL determines how data in an XML document is displayed on the Web. XSL controls what data will be displayed, in what format, and in what type size and style. XSL contains two major extensions: XSL Transformations (XSLT), a language used to covert XML documents to HTML or other document types, and XSL 91. XSL-FO. Acronym for Extensible Stylesheet Language Formatting Objects. An XML-based markup language for specifying formatting semantics. XSL-FO allows format and style information to be applied to an XML document and can be used with XSLT to produce source documents. See also XSL.

92. XSLT: Extensible Style sheet Language Transformations. A W3C recommendation for converting a document described with one set of markup into a document described by a different set of markup.

93. WELL-FORMEDNESS RULE: A syntactic constraint that all valid XML files must meet. XMI files and CWM XMI files, because they are also XML files, are subject to these constraints as well. Well-formedness constraints are specified in the definition of XML available from the Worldwide Web (W3C) consortium at www.w3c.org.

GENERAL OVERVIEW

As noted in FIG. 1, a Server 8 works in combination with the Personal Computer 9 in order to proceed with a series of steps to develop a relational schema which correlates to a previously-used hierarchical schema.

The present configuration operates to access a hierarchical database and schema. This schema can then be processed in order to then deploy a relational schema which correlates to the hierarchical schema. Then the relational schema can be used to generate a relational database which correlates to the original hierarchical database.

A model/code generator program is applied using XMI edit commands from a Data Management System (DMSII) to create source code which can be transferred to a Server 8.

Subsequently a Metastore library is compiled whereby an XMI schema is generated from the Metastore and transferred to a Personal Computer 9.

Based on the schema modeling, then the Common Warehouse Metamodel (CWM) on the specific database in the Metastore is transferred to an XMI file whereby utilization is made of "open tools" in order to diagram the schema for a relational database.

Figure 2:
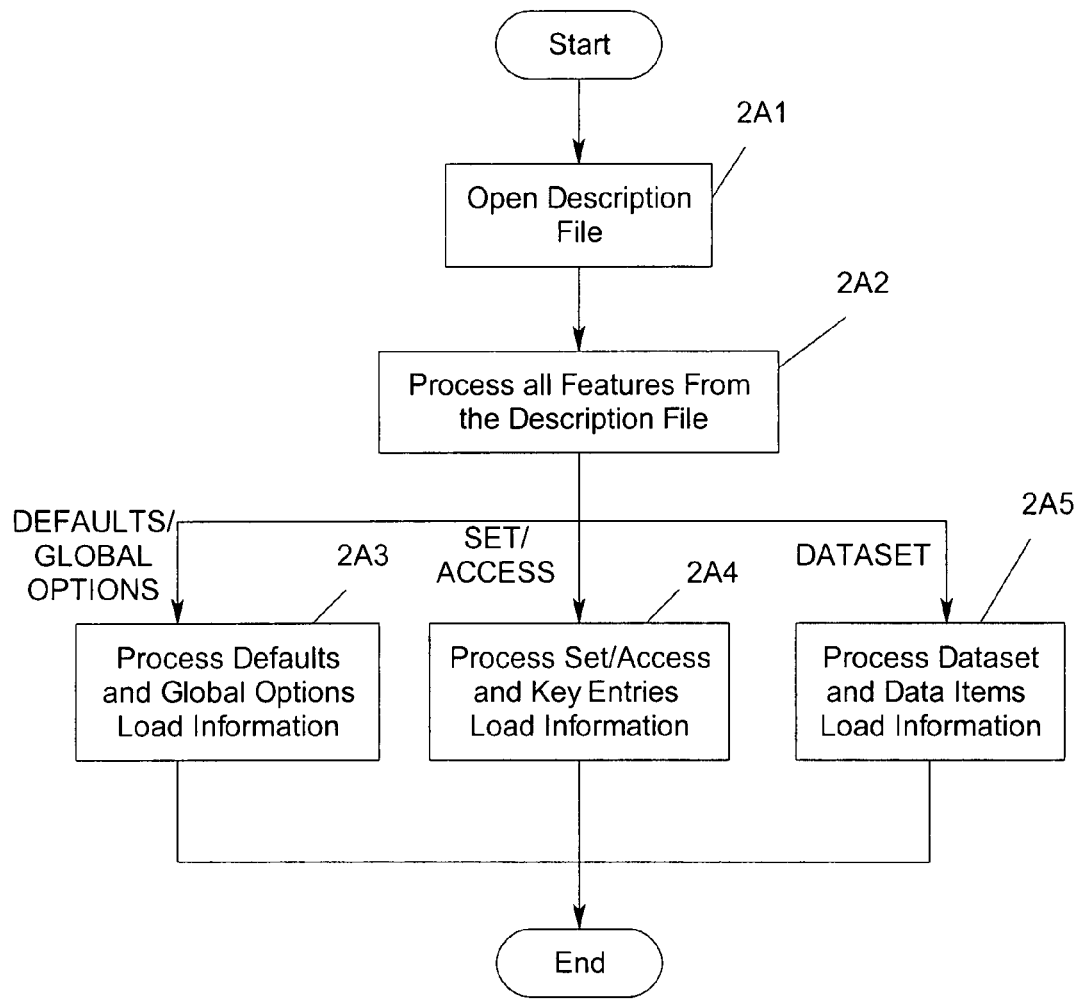
FIG. 2 is a flowchart showing the steps involved for loading the Data Management System schema into a Metastore Database from a description file.

In summary, the program develops as follows:

1) Check-in schema: Load DMSII Schema into Metastore from a Description File (FIG. 2). The Description file contains the schema information in a binary-linked list. This file is read by a program called MSDESCLOADER. This program decodes the schema and calls on entry points into MSSUPPORT so that the schema is loaded into the Metastore database.

Figure 3:
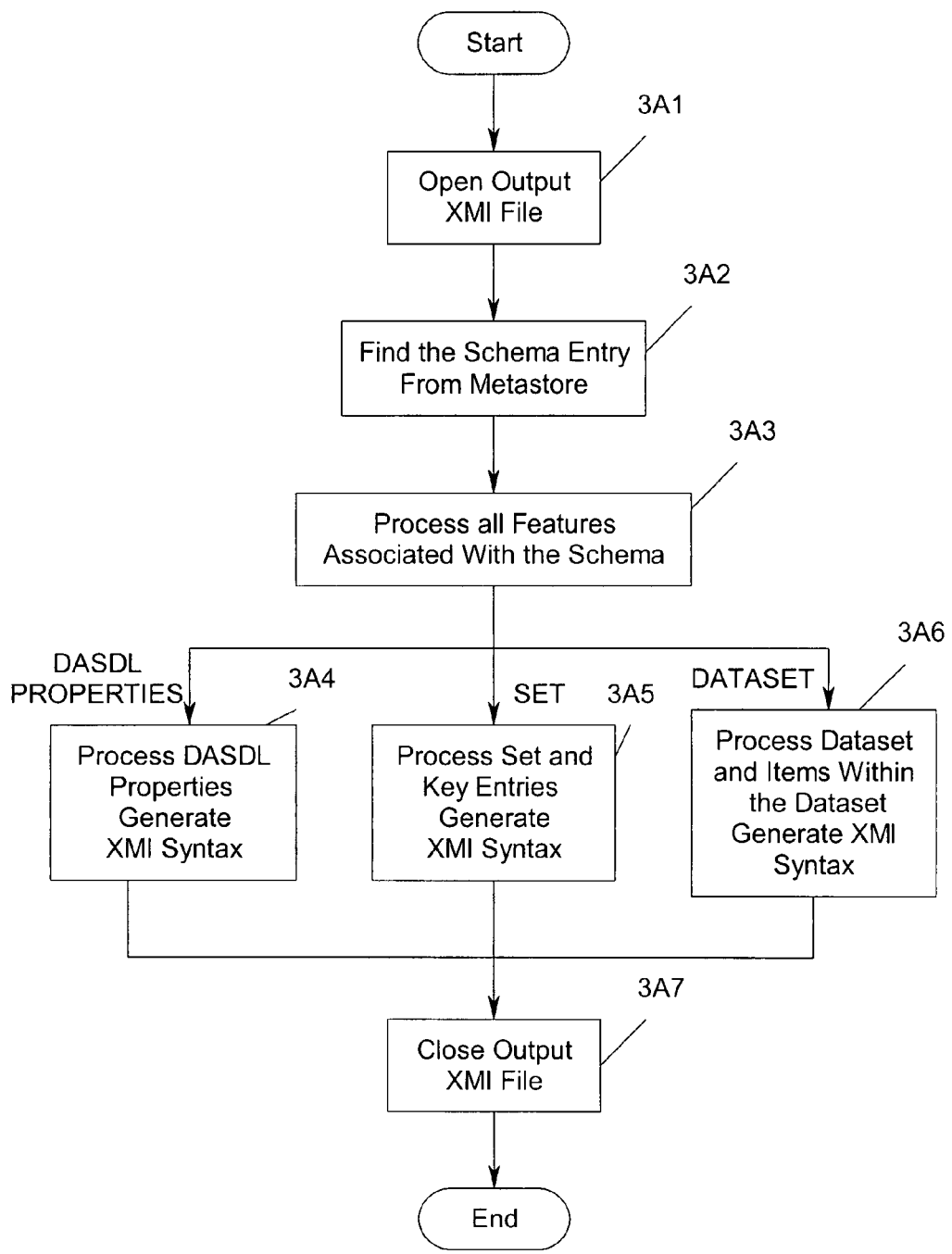
FIG. 3 is a flow chart showing the steps involved to generate an XMI schema file from the Metastore.

2) Check-out schema: Generate Schema XMI from Metastore (FIG. 3). Once the schema is in the Metastore database, the MSGENERATOR program extracts the schema from the Metastore, and creates an XMI file (DMSII XMI file).

3) FTP transfers this file into the PC.

4) Transform this XMI into an XMI that can be loaded into modeling tools—such as Embarcadero ER/Studio™.

5) The modeling tool reads the XMI and displays the schema in its GUI.

DESCRIPTION OF A PREFERRED EMBODIMENT

Now referring to FIG. 1 there is seen a generalized main flow of steps for conversion of a schema from a hierarchical schema to a relational schema.

The sequence starts at step 1A1 after which step 1A2 involves loading the hierarchical DMSII schema into a Metastore from a description file (which is further described in FIG. 2). The Server 8 manages steps 1A1, 1A2, 1A3, 1A4, 1A5.

The next step 1A3 involves generating the schema in XMI format from the Metastore (as later described in FIG. 3).

Then the generated XMI schema (from step 1A3) is converted to a DMSII XMI file at block 1A4 which is then transferred to the PC (Personal Computer) 9. The DMSII describes the hierarchical database in DMSII/hierarchical terms. The PC then manages steps 1A5, 1A6, 1A7, 1A8, 1A9, 1A10.

Then at step 1A5 the (schema from step 1A4 which has been converted to the DMSII XMI file), is transferred to the Personal Computer 9 via File Transfer Protocol (FTP).

At step 1A6, the XMI file is transformed with an XSLT to form a file as indicated later in FIG. 5.

Figure 4:
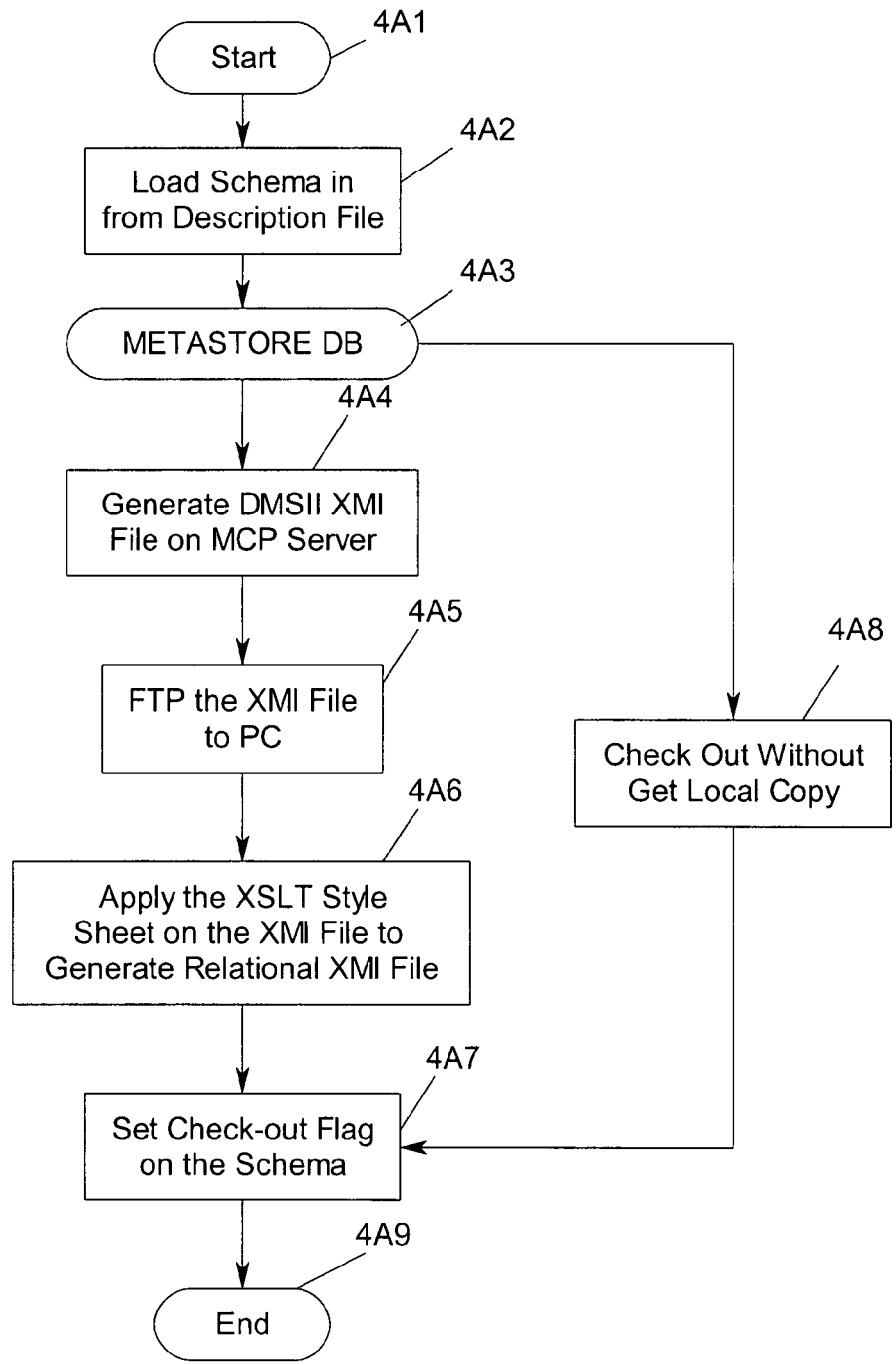
FIG. 4 is a flowchart showing the reverse engineering of a schema and the checkout of a schema for developing the relational database.

Here it should be noted that step 1A9 involves the use of a Graphical User Interface (GUI) between the Server 8 and Personal Computer 9 the details of which are shown in FIG. 4.

The next operation at 1A7 is where the file XMI (from step 1A6) is arranged into relational XMI file (1A7) in order that step 1A8 can diagram the schema in open tools to provide a relational schema for a database. This describes the same database in relational term.

FIG. 2 is a drawing showing the sequence of steps involved in loading a description file into the Metastore.

At step 2A1 the target description file is open, then at step 2A2 all data and structure definition language (DASDL) features are then retrieved from the description file and then each feature is processed based on its particular type.

At step 2A3 all defaults and global options are processed and then information is loaded into the Metastore. For database defaults and global options, the program will gather database defaults and global options (i.e. disk, buffer, statistic and audit specifications) from the description file and load them into the Metastore database.

At step 2A4 which involves Set/Access, all key entries are processed along with the Set/Access. Here information is further loaded into the Metastore. The Metastore holds all the various schemas of the DMSII databases. For Set/Access, the program will gather Set/Access information (i.e. name, type, duplicate option) from the description file and load them into the Metastore database. For keys of the Set/Access it will gather information (i.e. name, Ascending/Descending option) from the description file and load them into the Metastore database. The relationship between the Set/Access and its key items is maintained in the Metastore database.

At step 2A5 designated Dataset, here all items are processed along with the Dataset and the information is loaded into the Metastore. Example of a "dataset" is shown in Glossary #16. For Dataset operations, the program will gather dataset information (i.e. name, type) from the description file and load them into the Metastore database. For data items belonging to the dataset, it will gather information (i.e. name, type, size) from the description file and store them into the Metastore database. The relationship between the Dataset and its data items is maintained in the Metastore database.

Referring to FIG. 3 there is seen a sequence of steps involved in generating a schema XMI from a schema loaded in Metastore. Each description file/schema loaded into the Metastore Database is identified by a schema entry in the Metastore Database.

At step 3A1 an output file is opened for the XMI source. Then at step 3A2 the schema entry is found and located in the Metastore. Each description file/schema loaded into the Metastore Database is identified by a schema entry in the Metastore Database. The Metastore Database contains information about the schemas in its tables, and rows. The schema's name (say INVDB) for example is stored in a table called DMDB, and it has an ID field that holds a unique number. If the schema contained a DATASET (say STOCKTABLE), it is stored in the Metastore in a table called DMDS with its own unique ID. If the schema contained a SET (say STOCKSET), it is stored in the Metastore in a table called DMSET with its own unique ID. If the schema contained a DATAITEM (say itemname), it is stored in the Metastore in a table called DMDI with its own unique ID. If this DATAITEM happens to be a key of a SET, then it is stored in DMKI. Similarly all the aspects of the schema are stored in the Metastore database. The Metastore database contains tables for associations between these stored objects. The above stored objects are linked together in such association tables depending on the association.

At step 3A3 all features associated with the schema are retrieved from the Metastore and each feature is processed based on its type.

At step 3A4 this involves the DASDL properties. Here the DASDL (Data And Structure definition Language) properties are processed for defaults and for global options. The corresponding XMI elements for describing the defaults and options are written to the output file.

At step 3A5 designated SET, here all key entries are processed along with the SET. Then the corresponding XMI elements for describing the SET are written to the output file.

Then for step 3A6 (designated DATASET) here all items are processed along with the DATASET. The corresponding XMI elements for describing the DATASET are written to the output file.

After all schema features are processed, at step 3A7, the output XMI file is closed. At this point the Metastore has now been used in order to generate the relational schema in XMI. The XMI file is generated as part of the Check-out process. Here, the schema entries as described above are extracted and assembled in the XMI file. This XMI file will be processed further for consumption at in the modeling tools.

FIG. 4 involves the use of the Graphical User Interface (GUI) which allows a number of functions to be wrapped into the checkout mechanism in the Database Operations Center GUI.

FIG. 4 starts at step 4A1 and proceeds to step 4A2 where the schema is loaded in from the description file. Then at step 4A3 the Metastore database can be directly checked out without getting a local copy through use of step 4A8 which then directly enters step 4A7 where there the SET checkout flags on the schema are developed.

Returning to step 4A3 the Metastore database is then transferred and used in conjunction with step 4A4 to generate a DMSII XMI file on the MCP Server (Master Control Program Server—Glossary #42).This is Server 8 shown in FIG. 1.

Then at step 4A5, a file transfer protocol is used to transfer the XMI file to the Personal Computer 9.

At step 4A6 the sequence applies the XSLT stylesheet on the XMI file in order to generate the XMI file to form a relational XMI file that can be loaded into modeling tools such as the Embarcadero ER Studio™.

Then at step 4A7 there is a procedure to set the checkout flag on the schema after which the sequence ends at step 4A9. The schema was the one selected by the user to generate DMSII XMI file at step 4A4. The flag is set to let all users know that the schema is being edited by one user.

Thus the Graphical User Interface 1A9 has been used as a reverse engineering mechanism to reverse engineer the hierarchical schema and check out the relational schema which correlates to the original hierarchical schema.

Figure 5:
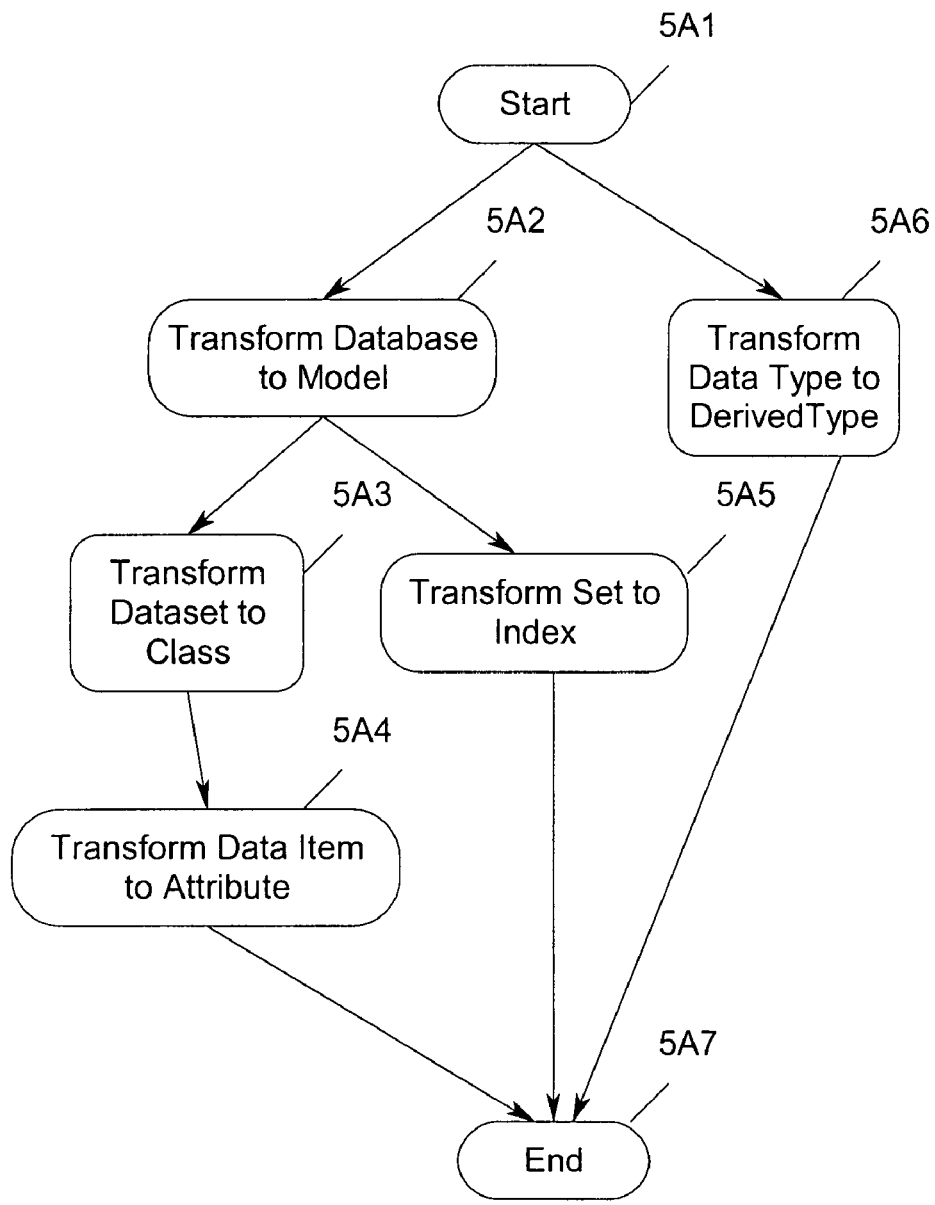
FIG. 5 is a chart showing the steps involved in transforming the XMI file using XSLT.

Referring to FIG. 5 there is seen a set of steps used to transform the XSLT file. The resulting XMI is understood by open tools and therefore can be displayed in those tools. The database parts such as DATABASE, DATASET, and DATA ITEM are transformed to a model and are written in an XMI file. These database parts are transformed as under:

DATABASE>Model

DATASET>Class

DATA ITEM>Attribute

The sequence starts at step 5A1 and proceeds to step 5A2 where there is a transformation of the Database element where the attributes of database element are used. Here the attributes of the database elements are used to generate an equivalent Model Element. As an example: The database name: PRODUCTIONDB. This is transformed as <Model name="PRODUCTIONDB">.

After step 5A2 there occurs step 5A3 where there is a transformation of the Dataset to Class. Here the attributes of the Dataset element are used to generate an equivalent Class element. As an example: The dataset name: STOCK. This is transformed as <class name="STOCK">.

Then step 5A4 is involved with transforming a Dataitem to an Attribute. Here the attributes of the Dataitem element are used to generate an equivalent Attribute element. As an example: The dataitem name: ITEMNAME. This is transformed as <attribute name="ITEMNAME">.

Likewise after step 5A2 then step 5A5 is also used to transform a SET to an Index. Here the attributes of the Set element are used to generate an equivalent Index element. Transform Set to Index. As an example: The set name: STOCKBYPRICE. This is transformed as <index name="STOCKBY PRICE">.

And further, returning to the start at step 5A1 there is a parallel step over to step 5A6 where there is a transformation of Data Types to Derived Types. A Derived Type is a specialized data type with additional properties. As an example: A data type defined in DMSII may be ALPHA (10). [This allows alphabetic characters of length 10]. This becomes a CHAR_10, a CHAR data type whose additional property is a length of 10.

Thus DMSII data types are mapped to relational data types. The mappings were created based on data type definitions and system limitations. For example, a DMSII NUMBER data type is translated to a relational Numeric data type and a DMSII REAL data type is translated to a relational Real data type. When a matching relational data type does not exist, a User Defined Type (UDT) is created using the DMSII data type name and this allows the users to associate the column of a table with such data type.

Described herein has been a method whereby an original hierarchical schema for a database can be processed to provide a relational schema which correlates to the original hierarchical schema.

While one embodiment of the invention has been described, there may be other possible embodiments developed which are encompassed by the attached claims.

What is claimed is:

1. In a network of computers where a Metastore database holds all the schemas of a Data Management System (DMS) database and wherein a Server operates from a Hierarchical database schema to enable a PC to develop a Relational schema which correlates to said original Hierarchical schema, a method for producing a Relational schema for a database in said PC comprising the steps of:

(a) utilizing a Description File which lays out all aspects of a database to load Database Management schema into said Metastore, wherein said utilization includes the steps of:

(a1) opening said Description File;

(a2) obtaining database features including Dataset, Set/Access, Database Defaults and Global Options from said Description File;

(a3) depending on the feature type, processing the following processes:

(i) For Dataset:

(ia) Gathering dataset information including name, type from the Description File and loading into said Metastore database;

(ib) For data items belonging to the Dataset, gathering information including name, type, size from said Description File and storing them into said Metastore database, such that a relationship between the Dataset and associated Data Items is maintained in said Metastore database;

(ii) For Set/Access:

(iia) Gathering Set/Access information including name, type, duplicate option from said Description File and loading them into said Metastore database;

(iib) For Keys of the Set/Access, gathering information including name, Ascending/Descending option from said Description File and loading them into said Metastore database, so that the relationship between the Set/Access and associated Key items is maintained in said Metastore database;

(iii) For Database Defaults and Global Options:

(iiia) Gathering database defaults and global options including disk, buffer, statistic and audit specifications from said Description File and loading them into said Metastore database;

(b) generating an XMI schema from said Metastore;

(c) using a Graphical User Interface to apply an XSLT style sheet to an XMI file to generate a Relational XMI file with Relational schema; and (d) viewing and editing said Relational XMI file using open tools, said Relational schema being usable to develop a Relational database.

2. The method of claim 1 wherein step (d) includes the steps of:

(d1) transforming the DMS database parts, including Database, Dataset and Data Item, to a model which is written in an XMI file wherein Database is transformed to Model, Dataset is transformed to Class, and Data Item is transformed to Attribute.

3. The method of claim 1 wherein step (d) includes the steps of:
 (d2) transforming a Data Type to a Derived Type which is a specialized data type with additional properties;
 (d3) transforming a Set to an Index.

4. The method of claim 1 wherein said Servers utilizes a specialized operating system designated as a Master Control Program (MCP).

5. A computer program product comprising:
 a computer-readable storage medium including program code that, when executed by a computer, causes the computer to perform the steps of claim 1.

6. In a network of computers where a Metastore database holds all the schemas of a Data Management System (DMS) database and wherein a Server operates from a Hierarchical database schema to enable a PC to develop a Relational schema which correlates to said original Hierarchical schema, a method for producing a Relational schema for a database in said PC comprising the steps of:
 (a) utilizing a Description File which lays out all aspects of a database to load Database Management schema into said Metastore;
 (b) generating an XMI schema from said Metastore, including the steps of:
  (b1) opening an output XMI file;
  (b2) finding a Schema Entry from said Metastore database which contains information about the schemas in its tables and rows within said Metastore database where said tables provide association between stored objects therein;
  (b3) processing all Features associated with said Schema Entry including Database, Dataset, Set and Data Items;
  (b4) processing in parallel the following processes:
   (i) processing Dataset and Data Items within the Dataset to generate XMI syntax;
   (ii) processing Set and Key Entries to generate XMI syntax; and
   (iii) processing Data and Structure Definition Language (DASDL) properties to generate XMI syntax;
  (b5) closing said output XMI file where said Schema Entries are extracted and assembled in said XMI file which will be processed for consumption in a modeling tool;
 (c) using a Graphical User Interface to apply an XSLT style sheet to an XMI file to generate a Relational XMI file with Relational schema; and
 (d) viewing and editing said Relational XMI file using open tools, said Relational schema being usable to develop a Relational database.

7. In a network of computers where a Metastore database holds all the schemas of a Data Management System (DMS) database and wherein a Server operates from a Hierarchical database schema to enable a PC to develop a Relational schema which correlates to said original Hierarchical schema, a method for producing a Relational schema for a database in said PC comprising the steps of:
 (a) utilizing a Description File which lays out all aspects of a database to load Database Management schema into said Metastore;
 (b) generating an XMI schema from said Metastore;
 (c) using a Graphical User Interface to apply an XSLT style sheet to an XMI file to generate a Relational XMI file with Relational schema, including the steps of:
  (c1) loading a schema from said Description File;
  (c2) establishing said Metastore database in Server;
  (c3) generating a DMS XMI file on said Server;
  (c4) filing said XMI file as an XMI file in said PC;
  (c5) applying an XLST Style Sheet on said DMS XMI file to generate a Relational XMI file; and
  (c6) setting a check-out flag on the schema which a user selected to generate said DMS XMI file at step (c3) and where said check-out flag informs all users that said schema is being edited by one user; and
 (d) viewing and editing said Relational XMI file using open tools, said Relational schema being usable to develop a Relational database.

8. In a network where a Server operating under a Master Control Reporting System (MCP) provides a Metastore database which holds all the schemas for a Data Management System database (DMS) configured in a special Data and Structure Definition Language (DASDL) and where said Server operates using a Hierarchical database schema to communicate with a Personal Computer (PC) to transform said Hierarchical schema to a Relational schema, a computer-implemented system including a processor for converting said Hierarchical schema in said Server to a Relational schema in said PC comprising:
 (a) means for accessing a Description File containing machine-readable layout of said DMS database and schemas contained therein;
 (b) means to for load said DMS schema to said Metastore including:
  (b1) means for accessing database features including Dataset, Set/Access, Database Defaults, and Global Options from said Description File; and
  (b2) processing means for processing said Dataset, said Set/Access, said Database Defaults, and said Global Options by gathering information as to name, type and size for storing into said Metastore database;
 (c) means for generating an XMI schema from said Metastore, including:
  (c1) means to for opening an output XMI file;
  (c2) means for selecting a Schema Entry from said Metastore database which contains information about the schemas in tables and rows within said Metastore database and where said tables provide association between stored objects therein;
  (c3) processing means for processing all features associated with said Schema Entry including:
   (c3a) processing means for processing Dataset and items within the Dataset to generate XMI syntax;
   (c3b) processing means for processing Set and Key Entries to generate XMI syntax;
   (c3c) processing means for processing said Data and Structure and Definition Language (DASDL) properties to generate XMI syntax; and
  (c4) means for closing said output XMI file after said Schema Entries are extracted and assembled in said XMI file said XMI file having been applied with an XSLT style sheet for use in a modeling tool;
 (d) Graphical User Interface (GUI) means for applying an XSLT style sheet on an XMI file to generate a Relational XMI file with Relational schema; and
 (e) open-tool means for transforming said Relational XMI file into a Relational file schema.

* * * * *